(12) United States Patent
Joensen et al.

(10) Patent No.: US 9,255,227 B2
(45) Date of Patent: Feb. 9, 2016

(54) PROCESS FOR THE SYNTHESIS OF HYDROCARBON CONSTITUENTS OF GASOLINE

(75) Inventors: Finn Joensen, Hørsholm (DK); Poul Erik Højlund Nielsen, Fredensborg (DK); Niels Christian Schiødt, Brønshøj (DK); Ton V. W. Janssens, Virum (DK); Bodil Voss, Virum (DK)

(73) Assignee: Haldor Topsoe A/S, Lyngby (DK)

( * ) Notice: Subject to any disclaimer, the term of this patent is extended or adjusted under 35 U.S.C. 154(b) by 368 days.

(21) Appl. No.: 12/518,616

(22) PCT Filed: Nov. 20, 2007

(86) PCT No.: PCT/EP2007/010017
§ 371 (c)(1),
(2), (4) Date: Jun. 10, 2009

(87) PCT Pub. No.: WO2008/071291
PCT Pub. Date: Jun. 19, 2008

(65) Prior Publication Data
US 2010/0036186 A1      Feb. 11, 2010

(30) Foreign Application Priority Data

Dec. 13, 2006  (DK) ................... 2006 01640
Feb. 23, 2007  (DK) ................... 2007 00288

(51) Int. Cl.
*C07C 1/20*       (2006.01)
*C10G 3/00*       (2006.01)
(52) U.S. Cl.
CPC .......... *C10G 3/49* (2013.01); *C10G 2300/1011* (2013.01); *C10G 2300/1022* (2013.01); *C10G 2300/805* (2013.01); *C10G 2400/02* (2013.01); *C10G 2400/20* (2013.01)

(58) Field of Classification Search
USPC .................. 585/733, 638–642; 518/711, 712; 260/449.5, 668 R, 676, 682; 208/118, 208/120, 135, 141
See application file for complete search history.

(56) References Cited

U.S. PATENT DOCUMENTS 2,691,034 A * 10/1954 Arnold et al. ................. 518/711
3,931,349 A *  1/1976 Kuo ............................. 585/733

(Continued)

FOREIGN PATENT DOCUMENTS

CN          1463290 A     12/2003
CN          1561320 A      1/2005

(Continued)

OTHER PUBLICATIONS

R. Le Van Mao, et al., "Conversion of Light Alcohols to Hydrocarbons Over Zsm-5 Zeolite and Asbestos-Derived Zeolite Catalysts", *Energy & Fuels*, vol. 3, No. 5 (1989), p. 620-624.

(Continued)

*Primary Examiner* — In Suk Bullock
*Assistant Examiner* — Sharon Pregler
(74) *Attorney, Agent, or Firm* — Dickstein Shapiro LLP

(57) ABSTRACT

Process for the synthesis of hydrocarbon constituents of gasoline comprising catalytic conversion in a gasoline synthesis step of an oxygenate-containing feed comprising methanol and/or dimethyl ether and a mixture of at least on a total oxygenate basis 0.05 wt % $C_{3+}$ higher alcohols and/or their oxygenate equivalents to hydrocarbon constituents of gasoline.

12 Claims, 9 Drawing Sheets

(56) References Cited

U.S. PATENT DOCUMENTS

| | | | |
|---|---|---|---|
| 4,076,761 A | | 2/1978 | Chang et al. |
| 4,263,141 A | * | 4/1981 | Moller et al. ............... 518/712 |
| 4,481,305 A | | 11/1984 | Jorn et al. |
| 4,668,656 A | * | 5/1987 | Hardman et al. ............ 502/318 |
| 4,752,622 A | | 6/1988 | Stevens |

FOREIGN PATENT DOCUMENTS

| | | |
|---|---|---|
| EP | 0 099 690 A2 | 2/1984 |
| EP | 0110 357 A2 | 6/1984 |
| GB | 1 446 522 | 8/1976 |
| JP | 59-098024 A | 6/1984 |
| WO | WO 2007/020068 A | 2/2007 |

OTHER PUBLICATIONS

B.E. Langner, "Reactions of Methanol on Zeolites With Different Pore Structures," *Applied Catalysis*, vol. 2, No. 5 (1981), p. 289-302.

Li-Min Tau, "Isotopic Tracer Studies of the Conversion of Alcohol Mixtures With a High Silica Zsm-5 Catalyst", *Fuel Processing Technology*, vol. 33, No. 1 (1993), p. 1-12.

S. Yurchak, "Development of Mobile's Fixed-Bed Methanol-to-Gasoline (Mtg) Process", *Studies in Surface Science and Catalysis*, vol. 36 (1988), p. 251-272.

J. Topp-Jorgensen, "Topsoe Integrated Gasoline Synthesis—The Tigas Process", *Studies in Surface Science and Catalysis*, vol. 36 (1988), p. 293-305.

R. Le Van Mao, et al., "Ethylene From Ethanol Over Zeolite Catalysts", *Applied Catalysis*, vol. 34 (1987), p. 163-179.

T. Mole, "Conversion of Methanol to Ethylene Over ZSM-5 Zeolite: A Reexamination of the Oxonium-Ylide Hypothesis, Using Carbon and Deuterium-Labeled Feeds", *Journal of Catalysis*, (1994), p. 423-434.

Y. Ono, et al., "Mechanism of Methanol Conversion into Hydrocarbons Over ZSM-5 Zeolite", *Journal of the Chemical Society, Faraday Transaction Articles*, vol. 77 (1981), p. 2209-2221.

K. J. Smith, et al., "A Chain Growth Scheme for the Higher Alcohols Synthesis", *Journal of Catalysis*, vol. 85 (1984), p. 428-436.

A.M. Hilmen, et al., "Synthesis of Higher Alcohols on Copper Catalysts Supported on Alkali-Promoted Basic Oxides", *Applied Catalysis A: General*, vol. 169 (1998), p. 355-372.

R.G. Herman, "Advances in Catalytic Synthesis and Utilization of Higher Alcohols," *Catalysis Today*, vol. 55 (2000), p. 233-245.

N. Kosaric, et al., "6.1.3. Motor Fuel Ethanol," *Ullmann's Encyclopedia of Industrial Chemistry*, 6th Ed. (2002).

N. Kosaric, et al., "Reduction of Energy Costs", *Ullmann's Encyclopedia of Industrial Chemistry*, 6th Ed. (2002).

T. Mole, "Conversion of Methanol to Ethylene Over ZSM-5 Zeolite: A Reexamination of the Oxonium-Ylide Hypothesis, Using [13]Carbon- and Deuterium-Labeled Feeds[1]." Journal of Catalysis, vol. 84, pp. 423-434, 1983.

* cited by examiner

PROCESS FOR THE SYNTHESIS OF HYDROCARBON CONSTITUENTS OF GASOLINE

This invention relates to the synthesis of a gasoline-rich product from oxygenate compounds. More specifically, the invention relates to an improved process of converting oxygenate compounds to obtain as product hydrocarbons useful as constituents of high quality gasoline.

The term gasoline as it is commonly used covers a product from the petroleum industry which contains as the main fraction hydrocarbons with a boiling point range similar to that of gasoline further characterised by the octane numbers expressing the quality of the fuel when used in gasoline motors (internal combustion engines). Some additives may be added to the hydrocarbons to obtain certain further qualities for the gasoline product. It is well known that gasoline products with low octane numbers can be blended with gasoline products with high octane numbers for the purpose of yielding satisfactory overall octane numbers.

Hereinafter the term "gasoline" shall refer to the wide range of hydrocarbons boiling within the gasoline boiling point range hereby holding gasoline qualities, either alone or in mixture with other sources of gasoline. The gasoline is typically composed by a variety of hydrocarbons comprising alkanes, olefins, naphthenes and aromatics with between 5 and 12 carbon atoms per molecule ($C_{5-12}$) whose boiling point is below 200 C.°.

Petroleum refining is the dominant provider of high octane gasoline to the transport sector. However, as the crude oil reserves are running out or become less accessible with time, it is quite foreseeable that this will lead to an increase of feedstock price and thereby an excessive gasoline production price, unless lower cost alternative feedstocks are applied for the production of gasoline.

It has been known for several decades how to produce high value gasoline products from synthesis gas (e.g. C. D. Chang, Catal. Rev. 15 (1983) 1). These conventional processes comprise the step of 1) synthesis of oxygenates from synthesis gas, the oxygenates comprising components such as methanol, dimethyl ether, ethanol, propanol, butanol, acetone, other higher alcohols and ethers followed by the step of 2) synthesis of gasoline product from the oxygenates. In the so-called MTG (Methanol-To-Gasoline) process, crude methanol is converted into an intermediate mixture of methanol, dimethyl ether (DME) and water which is subsequently fed in its entirety to a gasoline reactor in which the oxygenate mixture is converted into a gasoline product, as disclosed by S. Yurchak, Stud. Surf. Sci. Catal. 36 (1988) 251. The crude methanol may be produced from synthesis gas by conventional methanol synthesis technology. The overall reaction scheme may be specified as:

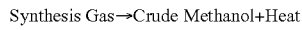

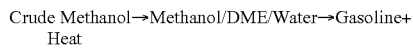

Besides the sequential synthesis described above, which involves the steps of conversion of synthesis gas to methanol which is recovered, e.g. as crude methanol, and subsequently re-evaporated and converted into gasoline an alternative process consists in an integrated synthesis layout, where the entire oxygenate product from the first step, including unconverted synthesis gas, is passed through the second synthesis step as disclosed by J. Topp-Jørgensen, Stud. Surf. Sci. Catal. 36 (1988) 293. According to the integrated process layout the overall reactions are:

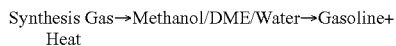

Synthesis gas, being the basic feedstock to both of the processes described above, may be produced from various hydrocarbon sources by conventional reforming and gasification technologies.

In the oxygenate synthesis step the primary methanol synthesis may take place at high selectivity. Methanol is synthesised from synthesis gas essentially according to the following equations:

which may be combined, in situ or in turn, with the synthesis of dimethyl ether (DME) from methanol according to the following equation:

Depending on the operating conditions and catalyst more or less by-product is formed (typically less than 1000 ppm by weight), primarily small amounts of higher alcohols (foremost ethanol), ketones, aldehydes and acids.

The conversion of synthesis gas may, however, also take place with substantial co-production of oxygenates and hydrocarbons other than methanol.

The combined synthesis of methanol and/or dimethyl ether is preferable as the further conversion of methanol to dimethyl ether increases the conversion per pass in the oxygenate synthesis section and reduces the heat evolved in the gasoline synthesis, which in turn secures a higher yield of gasoline product and/or a cheaper synthesis. A similar effect may be obtained through co-production of higher alcohols, optionally in combination with ether formation. Methanol and dimethyl ether are widely accepted as being equivalents as feed components in the gasoline synthesis, as the dehydration of methanol to dimethyl ether and water is extremely fast over the zeolite catalyst.

Consequently, the more synthesis gas converted to useful oxygenate as feed for the gasoline synthesis in the oxygenate step the higher the conversion per pass is obtained, thereby reducing the amount of recycle of unconverted synthesis gas around the oxygenate synthesis step. Additionally, the higher the amount of higher molecular weight oxygenates produced in the oxygenate synthesis, the less heat develops per mole of gasoline product synthesised in the gasoline synthesis step.

The oxygenate synthesis operating conditions influence the conversions through kinetics and equilibria. The operating temperature is typically in the range 200-350° C., wherein the formation of higher alcohols is particularly accelerated at temperatures above 250° C. Pressure is of specific relevance, since it influences greatly on the conversion per pass. The oxygenate synthesis normally is conducted under pressure of about 25 to 150 bar, preferably from about 30 bar.

Catalysts capable of converting synthesis gas to methanol, methanol in combination with dimethyl ether and a mixture of higher alcohols are all commercially available or methods of preparation are described in the literature. Catalysts, e.g. zeolites, gamma-alumina, silica and silica alumina which are able to convert methanol to dimethyl ether also hold activity to produce higher ethers, should higher alcohols be present. Such higher ethers are converted in the gasoline synthesis step equally well. Suitable methanol catalysts comprise zinc oxide, Cu or copper oxide or Cu/ZnO optionally with promoters and alumina.

Furthermore, iron, cobalt and nickel based catalysts optionally promoted by alkali are also known to produce mixtures of oxygenates and hydrocarbons from synthesis gas under the mentioned conditions.

In the gasoline synthesis step oxygenate is converted to primarily a fraction of hydrocarbons with a boiling point range characteristic to that of gasoline. The gasoline fraction comprises normal and branched hydrocarbons, olefins, naphthenes and aromatics. Furthermore, lower boiling hydrocarbons inclusive light olefins and alkanes are produced of which especially propane and butanes represent valuable products. Also ethane and methane are produced as byproducts.

In an integrated scheme, where the unconverted synthesis gas from the separation step downstream of the gasoline synthesis is returned to the oxygenate synthesis step, the olefins present in the recycled gas are readily hydrogenated over the methanol synthesis catalyst. The degree of synthesis gas recycle to the oxygenate synthesis step will in turn impact the gasoline product composition in that with a high recycle rate a relatively lower average C number (average number of carbon atoms in the hydrocarbon compounds) in the product is obtained, as the further methylation of the olefins are thence hindered.

The catalyst employed for the conversion of oxygenates is normally selected amongst zeolites. Preferred types are those with a silica to alumina mole ratio of at least 12 and pore sizes formed by up to 12 membered rings, preferably 10 membered. Examples of such zeolites are ZSM-5, ZSM-11, ZSM-12, ZSM-23, ZSM-35 and ZSM-38. The manufacture of these is well known, or the catalysts are commercially available. Particularly, preferred is the ZSM-5 in its hydrogen form, i.e. HZSM-5.

Other aluminosilicates and silicoaluminophosphates are also known to convert oxygenates to gasoline compounds.

Literally full conversion is obtainable depending on the oxygenate space velocity and the oxygenate composition.

Operating pressure in integrated gasoline synthesis layouts ranges from 25-150 bars. A separate, i.e. non-integrated, gasoline synthesis may take place from a few bars up, preferably at a pressure of 5 bars or more.

The yield of gasoline compounds from the conversion of oxygenates depends amongst other on the operating temperature. Typical gasoline reactor operating temperature is 250-500° C., preferably about 300-450° C.

The conversion of oxygenates to hydrocarbons (gasoline) is strongly exothermic. For example, the conversion of pure methanol into gasoline will result in an adiabatic temperature increase of about 600° C. Therefore, in an adiabatic gasoline reactor, it is necessary to dilute the oxygenate in order to avoid excessive temperatures. This may be achieved by establishing a recycle of light hydrocarbons by-products and/or unconverted synthesis gas, around the gasoline reactor (se earlier references by Yurchak and Topp-Jørgensen).

Higher alcohols in relation to the individual methanol to gasoline process have been investigated with respect to their influence on methanol conversion and product distribution over zeolites. Mainly mixtures of methanol and higher alcohols with weighty molar parts of higher alcohols have been studied.

U.S. Pat. No. 4,076,761 describes how gasoline may be produced in a process where coal is gasified to provide synthesis gas for a two-step gasoline synthesis occurring at 1-50 atmospheres. The two-step synthesis consists of a methanol synthesis step, whereby synthesis gas is converted to primarily methanol and impurities, preferably to a mixture of unconverted synthesis gas, alcohols, ethers and hydrocarbon followed by a gasoline synthesis step converting the linear hydrocarbons and the oxygenates (alcohols and ethers) to useful gasoline constituents.

The process is preferably conducted without inter-stage separation of the primary products as it was found that the second reaction step was insensitive to the impurities (ethers, higher alcohols and hydrocarbons) contained in the methanol product and to the presence of unconverted synthesis gas. It is mentioned that catalysts in the methanol synthesis step may be employed enabling an improved conversion of carbon monoxide by producing as by-products oxygenates such as dimethyl ether and higher alcohols. Maximum benefit is obtained by substantially converting all of the carbon monoxide to oxygenated product.

Numerous references, e.g. U.S. Pat. Nos. 4,752,622 and 4,668,656, JP patent application No. 59098024 A2 and EP patent application No. 0110357, describe the synthesis of higher alcohols from synthesis gas for blending into the gasoline pool.

Depending on the composition of the synthesis gas used as make-up or feedstock for the integrated gasoline synthesis, adjustments may beneficially take place externally, before the synthesis gas feed is added to the integrated synthesis loop or internally between/in the synthesis steps as described. Synthesis gas adjustments may comprise the adjustments obtained through the water gas shift reaction, whereby the hydrogen to carbon monoxide ratio may be increased if water is added to a process step active in the water gas shift reaction, or one or more components can be removed by absorptive or membrane units.

In U.S. Pat. No. 4,481,305 it is described how the conversion of synthesis gas produced from coal gasification may efficiently be converted to gasoline products in an integrated two-step synthesis with the first step producing methanol and dimethyl ether from synthesis gas, and the second step producing gasoline product from methanol and/or dimethyl ether. $CO_2$ being produced in the oxygenate synthesis is removed from the synthesis gas in a combined sour gas removal ($H_2S$, COS and $CO_2$) on the combined make up and recycle stream. In order to maintain a low flow rate through the sour gas removal and oxygenate section, a separate, internal gas recycle is established around the gasoline synthesis step. Water is added in a predetermined amount in order to yield maximum oxygenate production.

Both synthesis steps are conducted catalytically with appropriate conventional catalysts. In all of the above-mentioned layouts a portion of the unconverted synthesis gas after separation of gasoline or alcohol compounds is optionally recycled to the feeding point of the fresh synthesis gas, thereby increasing the overall degree of conversion of the synthesis gas. In U.S. Pat. No. 4,481,305 a split stream of the recycled unconverted synthesis gas is added to the effluent from the oxygenate synthesis in order to reduce the amount of gas sent through the oxygenate section. However the unconverted synthesis gas may also, at least partly, be conveyed to further processing downstream of the gasoline synthesis step, in which case the gasoline production is nested in a co-generation scheme.

It has been reported by Li-Min Tau et al, "Fuel Processing Technology", 33 (1993), 1, that pure propanol exhibits a higher reactivity as compared to pure methanol for the conversion to hydrocarbons over a ZSM-5 type catalyst at 300° C.

It has also been reported by R. Le Van Mao et al, Energy & Fuels 1989, 3, 620 that pure butanol at 470° C. converts to $C_{5+}$ with a higher yield over ZSM-5 as compared to pure methanol.

In another reference by R. Le Van Mao et al, Applied Catalysis, 34 (1987) 163-179, the reactivity of ethanol over various ZSM-5 (modified and unmodified) was investigated.

The ZSM-5 catalyst was tested at 400° C. at a weight hourly space velocity (WHSV) of 2.4 g/(g h). A higher conversion was obtained for the methanol as compared to the pure ethanol feed, whereas a lower yield was obtained for the mole mixture 77 mole % methanol/23 mole % ethanol.

It was also found (by R. Le Van Mao et al.) that the product distribution obtained from the conversion of propanol, n-butanol and isobutanol was very close to the product distribution of the pure methanol conversion. It was further suggested that mixtures of ethanol/methanol and higher alcohols produced in a previous step by the conversion of synthesis gas could be combined with an ethylene production step applying their Zn-modified ZSM-5 catalyst.

Another reference (by R. Le Van Mao et al, Energy & Fuels 1989, 3, 620) suggests the use of Zn-modified ZSM-5 catalyst for the conversion of mixtures of $C_1$-$C_4$ alcohols into high-grade gasoline, in that the durene level is reduced by using such a mixture as compared to pure methanol.

In the same reference the conversion of the said mixture of higher alcohols in methanol over unmodified ZSM-5 was studied for reference. A mixture of 35 mole % methanol, 40 mole % ethanol, 17 mole % propanol and 9 mole % 1-butanol was tested at 470° C. and compared to pure methanol conversion. It was found that the yield of $C_{5+}$ was higher with the mixed alcohol feed as compared to pure methanol.

It was found by T. Mole (J. Catalysis, 84, 423-434) that the addition of 6.5 C % n/i-propanol and t-butanol accelerates the conversion of aqueous (2.75/1 w/w) methanol at 280° C. Oxygenate conversions of up to about 20% have been reported but the disclosure is silent on the $C_{5+}$ yield at 100% conversion. For added ethanol it was found that it does not increase the conversion of methanol. As stated by Mole this is contradictive to Ono and Mori (J. Chem Soc. Faraday Trans. 1 vol. 77, p. 2209, 1981), who found that ethylene, which is the intermediate product of ethanol, co-catalyzes methanol conversion.

The information is somewhat spread on temperatures and alcohol feeds, thus no rigid picture can be drawn as to reactivity and yield of hydrocarbons by the addition of alcohols higher than methanol over ZSM-5 catalysts. It has not been reported anywhere that the by-product contained in a reduced methanol product (primarily ethanol) brings about any benefits of improved reactivity to gasoline over a zeolite catalyst. Neither has it been established the effects of adding minute amounts of alcohols higher than ethanol.

Langner (Appl. Catalysis, 2, p. 289, 1982) has shown that the addition of minute amounts of alcohols drastically shortens the so-called induction period, i.e. the period on stream at a given temperature and pressure before the conversion from methanol to hydrocarbons take place.

No link can be made between the transient behaviour of the kinetic medium (reactant, intermediate and product interplay with catalyst) until the methanol conversion to hydrocarbons is established inside the zeolite pores and the steady state behaviour once the conversion to hydrocarbons has begun, unless a well-defined model picturing the process can be laid down. Such a firm model does not exist.

Rather complex kinetic models must be applied in order to describe the conversion of oxygenates to hydrocarbons. The resulting product distribution from a conversion of oxygenate comprises more than 50 components and the yield of gasoline products and its distribution is related to operating conditions and composition of the reaction medium. However, generally speaking, the gasoline yield is adversely affected by an increase in operating temperature.

Thus, the main problems connected to the conversion of oxygenates to gasoline concern heat management.

Characteristic of the zeolites and related gasoline catalysts as described above is that two distinct types of deactivation take place. One type of catalytic deactivation relates to the formation of carbonaceous deposits, generally referred to as coke, on the surface of the catalyst, which is removed from the catalyst after a catalyst cycle (period of operation) in a regeneration procedure. It is widely recognised that high temperatures accelerate the formation of coke which deactivates the catalyst. Apart from catalytic deactivation coke also represents loss of carbon potential thus lowering the yield of useful product.

The catalyst cycle time is defined as the length of the period, wherein the catalyst exhibits proper catalytic activity. As deactivation by coke formation takes place, the amount of active catalyst available for conversion of oxygenate into gasoline is reduced. It is important to avoid a breakthrough of (i.e. a slip of unconverted) oxygenates as contents of oxygenates would complicate the separation step for obtaining the gasoline product. After such a cycle time, the catalyst must be regenerated by burning off the coke. Short catalyst cycle time means that an expensive type of reactor must be employed e.g. with continuous regeneration of catalyst circulated between reactor and regenerator, or that several reactors in parallel must be employed with frequent shifts in operation mode (synthesis or regeneration) and being equipped with complex control. An increased catalyst cycle time benefits the process by a reduction in investment and improved process efficiency.

The other type of deactivation is the irreversible dealumination of the catalyst structure. In time this type of deactivation leads to low catalytic performance and the catalyst charge will, eventually, have to be replaced with fresh catalyst. The operating temperature has great impact on the dealumination rate as well.

Thus, in addition to the adverse effect on product yield caused by excessive reaction temperatures, heat management is also of concern to both reversible and irreversible deactivation.

The solutions to the heat management problem described in U.S. Pat. No. 4,481,305 comprise adjusting the internal and/or external gas recycle so as to limit the temperature increase over the gasoline synthesis step individually set by the catalyst as applied. The adjustment of recycle in turn influences the feed composition. Other conventional means of adjusting the feed composition comprise changing the operating temperature of the oxygenate synthesis, the pressure, the amount of water added to the process and the rate of gas recycled to the make up of synthesis gas to the integrated synthesis.

Focusing on the gasoline reactor, the inlet composition of feed containing oxygenate primarily determines the heat of reaction evolved, thus in an adiabatic converter the temperature difference ($\Delta T$) between inlet and outlet closely relates to the inlet concentration.

The product obtained from the oxygenate synthesis step, disregarding the unconverted synthesis gas, is hereinafter called the reduced product.

The relatively more (on a/constant carbon basis) of ethers, higher alcohols and hydrocarbons contained in the reduced product from the first synthesis step, the lower the reaction heat evolved per amount of gasoline product obtained from the gasoline step. Advantageously, if less heat develops per mole of gasoline product, the gasoline yield increases and/or the demand on temperature management during synthesis is reduced.

A minimum inlet temperature must also be observed since it is characteristic to zeolites applied for the gasoline synthesis that, below a certain lower temperature, the conversion rate towards useful components is prohibitively low.

Catalytic reactors useful in the conventional process must thus comply with the requirements to heat management described above. At the same time the reactor must be able to withstand the operating conditions during regeneration of the catalyst.

Fluidised bed reactors clearly meet the requirements to heat management, as the feed temperature may in a wide range of reduced product concentration be adjusted such that the exit temperature does not exceed the maximum temperature limit. This reactor type, however, is best suited for low pressure operation and requires a catalyst with supreme mechanical strength.

Adiabatic reactors are without internal heat management, thus the heat evolved must be controlled by adjusting the feed composition properly. However, adiabatic reactors are easily applicable for regeneration service in turn with normal operation without the risk of mechanical wear. In addition, adiabatic reactors are cheaper than any other reactor types.

Cooled reactors may be used with the limitation of mechanical stability of construction during the operation cycles shifting from normal operation to regeneration and back. Cooled reactors are typically operated with a boiling medium in heat conduction relationship with the catalyst bed, thereby removing reaction heat from the reaction zone. The preferred boiling medium is water, as water is chemically stable and most often the steam generated by the removal of heat may be used for utilities directly. On the other hand, a practical limitation to pressure means that boiling water temperatures above 325° C. are rarely seen. Using boiling water with higher temperatures up to about 340° C. is conventional, however expensive. Other mediums have been applied, but overall these solutions are more expensive.

The efficiency, or in other words how close operation is to isothermal conditions depends on the mechanical layout, the exothermicity (which may be expressed through the adiabatic temperature rise), the kinetics and the heat conducting properties of the catalyst and reaction medium. In general, it can be said that cooled reactors conducting exothermic reactions exhibit lower maximum temperatures than adiabatic, as long as the cooling temperature is lower than the adiabatic outlet temperature.

Quenched or inter-cooled reactors are variants to the adiabatic reactor type, which require flow and temperature controls in order to comply with the temperature limits given. Considering the entire integrated process, the gas flow rate through the gasoline synthesis step is a function of both the recycle gas rate to the oxygenate step and the recycle gas rate(s) around the gasoline synthesis step. In other words, the gas recycles, i.e. both internal and external recycle, resulting in a gas flow rate through the gasoline synthesis step should favourably be determined such that for optimal conversion of synthesis to oxygenates in the oxygenate synthesis step the operating temperature in the gasoline synthesis step, whether in an adiabatic, cooled, inter-cooled or quenched reactor, should be kept within the temperature range as defined by the lower temperature and the upper temperature limits. Minimising the gas flow rate through the gasoline reaction step will improve the process economics through reduction of equipment sizes and in the cost of utilities when operating the process.

It is an objective of the invention to provide a process whereby oxygenates including amongst others $C_{3+}$ higher alcohols and methanol are converted to hydrocarbons useful as constituents of high quality gasoline.

It is also an objective of the present invention to provide an improved process for converting synthesis gas to high value gasoline products at a high yield.

It is furthermore an objective of the invention to carry out the gasoline synthesis process in a boiling water reactor being able to withstand operating conditions through the operation period as well as during regeneration.

BRIEF SUMMARY OF THE INVENTION

The invention concerns therefore a process for the synthesis of hydrocarbon constituents of gasoline comprising catalytic conversion in a gasoline synthesis step of an oxygenate-containing feed comprising methanol and/or dimethyl ether and a mixture of at least, on a total oxygenate basis, 0.05 wt % $C_{3+}$ higher alcohols and/or their oxygenate equivalents to hydrocarbon constituents of gasoline.

DETAILED DESCRIPTION OF THE INVENTION

Figure 1:
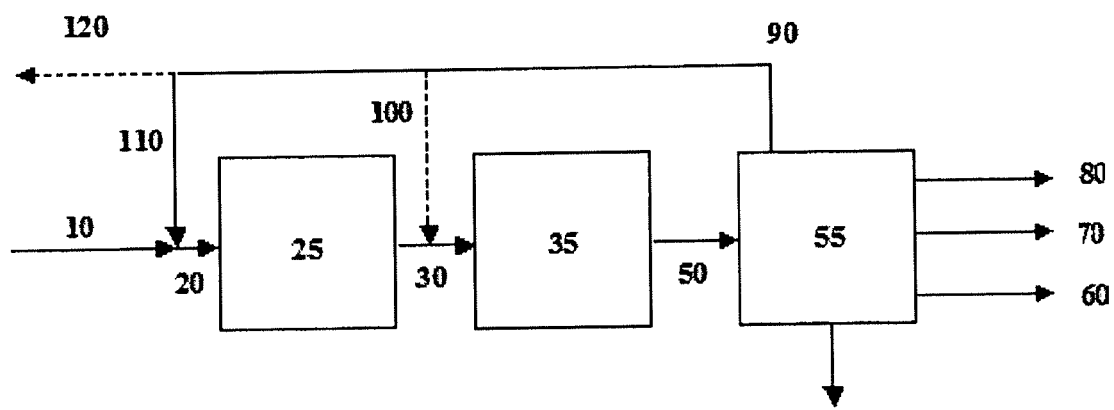
FIG. 1 shows an embodiment of the process.

The invention concerns gasoline synthesis conducted in individual steps as well as synthesis conducted in an integrated layout process.

It has now been found that a synergistic effect of the synthesis steps of the integrated gasoline synthesis arises when securing a content of at least 0.05 wt % on a total oxygenate basis, $C_{3+}$ higher alcohols in the feed to the gasoline synthesis step allowing for a reduction of the recycle rates over the gasoline synthesis step and/or an increase of overall gasoline yield improving the process economics of the gasoline process.

Quite surprisingly, the synergy in the integrated synthesis of oxygenate and gasoline arises when the oxygenate synthesis step produces higher alcohols in adequate amounts. Keeping a fixed production rate and quality of gasoline, the feed flow rate to the oxygenate synthesis step is thereby reduced considerably whilst allowing for a beneficial reduction of the inlet temperature to the gasoline synthesis step. Even more surprising is that this synergy is prevalent at quite low concentrations of at least 0.05 wt % $C_{3+}$ higher alcohols on a total oxygenate basis in the oxygenate feed to the gasoline synthesis step.

It has been found that when converting mixtures of $C_{3+}$ higher alcohols over a zeolite catalyst such as ZSM-5, the temperature, by which a given conversion (1-99%) to hydrocarbons is obtained, is significantly lower than the temperature for obtaining the same conversion when applying pure methanol or methanol having by-product levels of ethanol, propanol and butanol, whilst maintaining a comparable product quality.

It has specifically been found that a surprising unlinearity rules this phenomenon in that low level between 0.05-1 wt % of $C_{3+}$ higher alcohols maintains the effect. The effect is obtained in the integrated process, e.g. when higher alcohols are co-produced in the oxygenate synthesis step, as well as when carrying out gasoline synthesis in individual steps with co-feed of $C_{3+}$ higher alcohols or by producing in a separate plant an oxygenate containing $C_{3+}$ higher alcohols.

It has further surprisingly been found that the temperature reduction enabled by the presence of $C_{3+}$ higher alcohols in the oxygenate feed is highest when the oxygenate feed contains between 5 wt % and 15 wt % of $C_{3+}$ higher alcohols.

It has furthermore been found that comparably low levels of primarily ethanol do not accelerate the methanol conversion to hydrocarbons to the same extent as do $C_{3+}$ higher alcohols, such that the content of $C_{3+}$ higher alcohols in the reduced product should be greater than 0.05 wt % on a total oxygenate basis in order to obtain the effect in this instance.

The reduced product comprises oxygenates ($C_{3+}$ higher alcohols) prepared in the oxygenate synthesis, methanol and preferably includes dimethyl ether and higher ethers optionally also hydrocarbons.

It has been found that the sole addition of ethanol at high levels (30%) does accelerate the conversion of methanol but results in a lower yield of product, whereas alcohol mixtures containing ethanol amongst other higher alcohols is superior to any of its individual constituents as to both conversion and yield.

The presence of low amounts of $C_{3+}$ higher alcohols, i.e. in amounts of 0.05-1 wt % on a total oxygenate basis, in the reduced product contained in the feed to the gasoline reactor will:

(1) allow for a reduced inlet temperature to the gasoline reactor, and (2) lead to a reduction of the adiabatic temperature rise at full conversion.

This leads to an improved $C_{5+}$ yield in either adiabatic or cooled reactor types. Alternatively, with maintained exit temperature it allows for the increased concentration of reduced product in the feed to the gasoline synthesis step, i.e. it allows for an increased adiabatic temperature rise and, thereby, for a reduction of the total feed flow rate to the gasoline reactor section. In a loop configuration this reduces the amount of gas that must be recycled in order to control the temperature level.

Thus, if a feed stream to the gasoline synthesis step contains low amounts of $C_{3+}$ alcohols, between 0.05 and 1 wt % in the oxygenate composition, the above mentioned benefits will arise.

The presence of $C_{3+}$ higher alcohols in the reduced product allows for a reduction of the operating temperature of the gasoline synthesis step. While conventionally the inlet temperature in the gasoline synthesis step is typically minimum 350° C., the presence of $C_{3+}$ higher alcohols in amounts of 0.05 wt % or higher on a total oxygenate basis brings about the effect that the gasoline synthesis may be carried out at a lower minimum inlet temperature than conventionally, approximately at least 20° C. lower. The operating temperature may for instance be reduced from 350° C. to 320-330° C.

This reduction in operating temperature is particularly advantageous since it allows the application of gasoline synthesis reactors of the boiling water type effecting cooling of the process such that the minimum operating temperature is below 340° C. Preferably, the temperature of the boiling water is approximately 325° C. or below this value. Conventional gasoline synthesis processes usually require reactors that can operate at higher temperatures of for instance 350-400° C. Securing a minimum temperature of 350° C. would set the pressure of the boiling water to more than 165 bar, which render the boiling water reactor economically unattractive.

The invention provides further an improved method of converting synthesis gas in an integrated oxygenate and gasoline synthesis, the improvement of which is obtained by producing in the oxygenate synthesis step a reduced product with a content of $C_{3+}$ alcohols of at least 0.05% on a total oxygenate basis. The synergistic effect is observed in an integrated system under aforementioned conditions resulting in a decrease of the recycle gas flow rate and especially the gas flow rate through the oxygenate synthesis step.

The reduction of the recycle rate around the gasoline synthesis step is accomplished by the influence of the adequate degree of $C_{3+}$ higher alcohols produced in the oxygenate synthesis step in that the lower temperature limit of the gasoline synthesis step is hereby decreased. In turn, the oxygenate synthesis step benefits from the additional production of higher alcohols, which leads to a higher conversion of synthesis gas per passage through said step and, thereby, a higher oxygenate productivity.

The integrated gasoline process comprises the following steps:

synthesis gas with a volumetric ratio of hydrogen to carbon monoxide of for instance between 0.1 and 6 is fed to a synthesis section comprising two primary conversion steps: an oxygenate synthesis step followed by a gasoline synthesis step, the feeding point being anywhere convenient to the process, e.g. upstream of the oxygenate synthesis step.

in the oxygenate synthesis step synthesis gas is converted to a reduced product comprising methanol, higher alcohols and preferably including dimethyl ether and higher ethers, optionally also hydrocarbons; the effluent further contains unconverted synthesis gas and inerts. The oxygenate synthesis step may be split into partial oxygenate synthesis steps which may involve any conventional reactor types and be arranged in series and/or parallel.

in the gasoline synthesis step the oxygenate fraction of the reduced product is dehydrated to gasoline compounds (hydrocarbon constituents) at a high yield with co-production of useful light products and minor amounts of methane and ethane, the useful products being separated downstream at least partly from the unconverted synthesis gas. The applicable gasoline reactor types comprise adiabatic, inter-cooled or quenched and cooled reactors and may be split into one or more sections and be arranged in series and/or parallel as conventionally known.

The gasoline reactor types may advantageously include cooled reactor types indirectly cooled by the generation of steam from boiling water.

Inert gases contained in the synthesis feed gas and lower paraffins being produced in the synthesis, and not being dissolved in the separation step, must be purged at an appropriate point in the synthesis. The purge stream may be minute (<10%) as compared to the synthesis loop make up synthesis gas reflecting a high degree of conversion taking place from synthesis gas to gasoline or it may be in an amount, which is then available for further downstream processing.

Unconverted synthesis gas may be recycled to any process point upstream of the oxygenate synthesis step that is either to the synthesis gas preparation section or to any point in the oxygenate synthesis step and/or to the gasoline synthesis step.

If the ratio of the internal and the external recycle streams are kept constant the same degree of unwanted olefin hydrogenation is conducted in the oxygenate synthesis step securing a comparable/similar hydrocarbon product. In this respect there is no other distinction between the external and the internal recycle in that the internal recycle encloses a smaller number of partial oxygenate synthesis steps than does the external.

Optionally, water/steam addition and $CO_2$ removal units placed in the integrated synthesis section secures optimal utilisation of the synthesis gas conversion to gasoline. This layout is preferred when the target hydrogen to carbon monoxide ratio is approximately or below 1, and the oxygenate fraction comprises dimethyl ether and/or higher ethers. In this case the thermodynamic potential of the oxygenate conversion can be tremendously increased. These aspects are discussed in U.S. Pat. No. 4,481,305.

The level of $C_{3+}$ higher alcohols in the inlet to the gasoline reactor above 0.05 wt % on a total oxygenate basis in the reduced product and the amount of unconverted synthesis gas recycled to the oxygenate reaction step and/or the gasoline reactor step should be adjusted so as to operate the gasoline conversion reactor at temperatures above the lower and not exceeding the upper temperature limits as set by the catalyst.

In accordance herewith the inventive process provides an improved method of producing gasoline by establishing a reduced recycle around an oxygenate synthesis step and/or a gasoline synthesis step such that the concentration of the oxygenate and hydrocarbon at the inlet of the gasoline reactor enables the reactor to be operated through the cycle time at temperatures between the lower and the upper temperature limits as set by the demands to gasoline yield.

The invention provides further a method for converting methanol to hydrocarbons with a higher yield and/or a lower catalyst deactivation rate when the higher alcohols contained in the feed stream to the gasoline synthesis step is in the range 0.05-1 wt % of $C_{3+}$ higher alcohols on a total oxygenate basis. The higher alcohols may originate from an oxygenate synthesis step in combination (integrated), or it may originate from a separate synthesis step external to (i.e. not integrated into) the gasoline synthesis or the $C_{3+}$ higher alcohols may be imported and simply co-fed with the feed to the gasoline synthesis step.

It is well-known that the gasoline catalysts in general are very active in the etherification of alcohols. Thus, when subjected to the gasoline synthesis catalyst any mixture of alcohols and ethers will immediately equilibrate by contact with the acidic gasoline catalyst.

Therefore, it is to be understood that, in the process of the invention with respect to the higher alcohols content in the reduced oxygenate product or in the oxygenate admixture, the amount of $C_{3+}$ higher alcohols bound as ethers count as well and are therefore considered as part of the $C_{3+}$ higher alcohols present in the reduced product. In other words, the ether derivatives of the $C_{3+}$ higher alcohols are regarded as equivalents to the $C_{3+}$ higher alcohols themselves. Oxygenate admixture is the resulting fraction of oxygenate in the gasoline synthesis feed stream originating from oxygenate co-fed and/or produced separately and/or produced in the integrated synthesis (i.e. the reduced product).

When the higher alcohols needed for carrying out the process of the invention are provided by adding or co-feeding higher alcohols to a sequential or integrated synthesis, the higher alcohols may favourably be added to the oxygenate synthesis step. In this case also the addition of ethanol is advantageous. Thus, even though ethanol is not in itself as beneficial for the conversion of oxygenates into hydrocarbons as are $C_{3+}$ higher alcohols, ethanol is beneficial for the formation of $C_{3+}$ alcohols in the oxygenate synthesis step. It is widely recognised that ethanol is an intermediate in the formation of higher alcohols and other oxygenates from synthesis gas and that the addition of alcohols containing at least one C—C bond and ethers of such alcohols greatly enhances the formation of higher alcohols (see e.g., K. J. Smith and R. B. Anderson, Journal of Catalysis 85 (1984) 428; A.-M. Hilmen et al., Applied Catalysis A, 169 (1998) 355; R. G. Herman, Catalysis Today 55 (2000) 233).

In other words, whereas the addition of ethanol and/or ethers thereof are not as beneficial for the conversion of oxygenates into hydrocarbons as are $C_{3+}$ higher alcohols, the addition of ethanol and/or its ethers to the oxygenate synthesis step does promote the formation of $C_{3+}$ alcohols beneficial for the conversion of oxygenates into hydrocarbons. It is therefore also an objective of the present invention to provide a method for converting ethanol into valuable hydrocarbon product by adding an ethanol-containing stream to the oxygenate synthesis step.

The addition of ethanol-containing mixtures to the oxygenate synthesis step to promote the formation of higher alcohols is particularly relevant to the invention, because such mixtures may be produced from regenerative energy sources (renewables) such as agricultural crops, forest products and industrial, agricultural and forestal byproducts and residues comprising household and municipal waste, as practiced on a relatively large scale by fermentation or bacterial processes to produce so-called bioethanol. Bioethanol is gaining importance as a gasoline blending component due to its potential of reducing carbon dioxide emissions.

As a blending agent for gasoline the ethanol must be essentially water-free in order to avoid phase separation. According to Ullmann (Ullmann's Encyclopedia of Industrial Chemistry, $6^{th}$ Ed., 2002), 99.5% purity is required. One of the drawbacks in the production of bioethanol of such high purity is that distillation requires large amounts of energy. According to Ullmann, a motor fuel ethanol plant has a total energy consumption of between 1.1 and 1.6 MJ per liter of ethanol.

In one embodiment of the present invention aqueous ethanol, e.g. as obtained by fermentation or bacteriological processes, may advantageously be added to the oxygenate synthesis step of a sequential or an integrated synthesis. In the integrated synthesis this is particularly advantageous at low synthesis gas hydrogen to carbon monoxide ratios as typically obtained by gasification of solid fuels or heavy oil. In such cases it is preferred to add a certain amount of steam to the synthesis gas in order to attain the optimum stoichiometric ratio between hydrogen and carbon monoxide with respect to the oxygenate synthesis step through the water gas shift reaction shown in equation (2). Thus, the addition of aqueous ethanol simultaneously serves to adjust the hydrogen to carbon monoxide ratio and to promote the formation of $C_{3+}$ higher alcohols.

This embodiment provides further a method for efficient utilisation of aqueous ethanol, e.g. as produced by fermentation, thus saving energy and reducing equipment cost for the distillation of raw aqueous ethanol into fuel grade ethanol not to mention the savings in infrastructure such as refineries and gas stations relating to the manufacture of ethanol-blended gasoline.

Numerous methanol synthesis catalysts are capable of hydrogenating aldehydes, ketones and carboxylic acids and alkyl esters thereof to alcohols which constitute an easier convertible group of oxygenate than do aldehydes and ketones. Therefore, streams containing aldehydes, ketones and carboxylic acids and their esters may also be useful in promoting the formation of $C_{3+}$ higher alcohols in the oxygenate synthesis step.

Catalysts suitable for use in the oxygenate synthesis step for the production of higher alcohols comprise $ZnO/Cr_2O_3$, $Cu/ZnO$, transition metal sulphides, e.g. $MoS_2$ and Cu-containing oxide complexes each promoted with alkali and further $ZnO/ZrO_2$ promoted with a redox oxide and a strong base, Pd and Cu on zirconia/rare earth oxides or noble catalysts. In particular, Cu and/or ZnO based catalysts are useful for the conversion of synthesis gas to mixtures of methanol and higher alcohols.

In relation to the invention the preferred higher alcohol catalysts are those with low sensitivity towards the presence of $CO_2$ and with an operation temperature in the operating range of the oxygenate catalyst present, i.e. 200-350° C. The yield of higher alcohols in a higher alcohol synthesis may not be high. Preferably, the formation of hydrocarbons less than $C_5$ is low. Preferably, if the catalyst activity toward the production of higher alcohols is low, only a low content of higher alcohols in the reduced or admixed oxygenate is aimed for.

The catalyst active in the synthesis of higher alcohols may be placed in a separate reactor in series or in parallel in the oxygenate synthesis step, but it may also beneficially be placed in a reactor together with one or more other oxygenate synthesis catalysts.

FIG. 1 will now be used to illustrate the invention as described above in one of its embodiments. Heat exchangers and compressors are not shown.

Synthesis gas 10 available from for instance the synthesis gas preparation section is introduced to the integrated gasoline synthesis loop comprising an oxygenate synthesis reactor 25, the gasoline synthesis reactor 35 and the separation unit 55. Preferably, synthesis gas 10 is introduced immediately upstream the oxygenate synthesis reactor 25 though other addition points may be used, e.g. interstage the individual oxygenate synthesis steps should more than one be present. Optionally, an external recycle stream 110 obtained from separation unit 55 is added to synthesis gas 10 and the admixture 20 is passed to the oxygenate synthesis reactor 25. An internal recycle stream 100 obtained from separation unit 55 can be added to the reduced product comprising oxygenates.

Oxygenate synthesis reactor 25 may comprise one or more reactors, of which the type is any conventionally known, loaded with one or more catalysts enabling the conversion of synthesis gas to the reduced product comprising oxygenates comprising at least 0.05 wt % of $C_{3+}$ higher alcohols on a total oxygenate basis.

The effluent 30 from the oxygenate synthesis reactor 25 containing the reduced product is optionally mixed with recycle gas 100 from the separation unit 55 to form a total feed to the gasoline synthesis reactor 35. The content of oxygenates in general is thus adjusted to bring about a conversion in the gasoline synthesis step within the temperature range as defined by the lower and the upper temperature limit previously described.

The effluent 50 from the gasoline synthesis reactor 35 containing gasoline product and amongst others light products is passed to a separation unit 55. Separation unit 55 comprises means for separating unconverted gas from gasoline products, light products and water and recovery of valuable products from purge gas if present. The separation unit 55 can also include a distillation unit for obtaining gasoline product.

One layout of separation unit 55 may comprise a 3-phase separator, purge gas wash and product fractionation into fuel gas 80. The fuel gas is purge gas optionally freed of valuable products combined with dissolved gas, LPG 70 being the light product, optionally being further processed in order to hydrogenate olefin contents and gasoline 60 being the high boiling hydrocarbons produced as main product. Unconverted gas 90 separated and not purged is then recycled to optionally the synthesis gas preparation section via line 120 and the oxygenate synthesis reactor 25 through line 110 and/or to the gasoline synthesis reactor 35 through line 100.

The oxygenate synthesis reactor 25 may comprise one or more synthesis reactors in which oxygenates can be synthesised. The catalysts used in the oxygenate synthesis may be arranged in the one or more oxygenate synthesis reactors at one or more temperature levels and with one or more feeding points for the synthesis gas. The catalyst(s) or fractions hereof applied should apart from being active in methanol formation from synthesis gas also be active in the catalysis of $C_{3+}$ higher alcohols.

Preferably also a catalyst active in ether formation is present in the oxygenate synthesis section, the catalysts arranged or mixed such that the reduced product comprises at least methanol, dimethyl ether and $C_{3+}$ higher alcohols. Advantageously, the use of a recycle 100 around the gasoline synthesis step 35 reduces the need for gas recycle around the oxygenate synthesis step provided that a satisfactory degree of conversion of synthesis gas to oxygenates is obtained.

Optionally, the catalysts may be arranged or mixed or added such that the reduced product further comprises higher ethers and hydrocarbons. Examples of such catalyst combinations are numerous, and the number of possible layouts or arrangements of these is excessive. One example is illustrated in FIG. 2.

Figure 2:
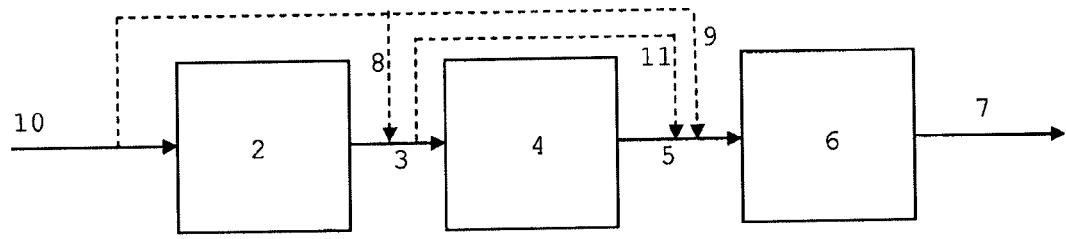
FIG. 2 shows a catalyst arrangement in an embodiment of the invention.

FIG. 2 illustrates an example of an arrangement of the catalysts. Coolers are not shown as their arrangement is irrelevant to the process described. The catalysts may be placed in one or more reactors as convenient.

Three oxygenate synthesis steps are shown in this embodiment. Synthesis gas 10 is converted to methanol in a first oxygenate synthesis step 2 using a methanol synthesis catalyst such as the commercially available MK 121 manufactures by Haldor Topsoe A/S, which is of the Cu/ZnO based type. The first oxygenate effluent 3 containing methanol is then transferred from the first oxygenate synthesis step 2 to a second oxygenate synthesis step 4 containing catalysts suitable for the further conversion of unreacted synthesis gas and some of the methanol to a second oxygenate effluent 5 containing dimethyl ether amongst others. Examples of these catalysts are alumina-containing catalysts or silica-alumina-containing catalysts e.g. the commercially available DMK-10 from Haldor Topsøe A/S. The second oxygenate effluent 5 from second oxygenate synthesis step 4 comprising methanol, dimethyl ether and unconverted synthesis gas is further converted in a third oxygenate synthesis step 6 to a third oxygenate effluent 7 comprising methanol, dimethyl ether, $C_{3+}$ higher alcohols, $C_{3+}$ higher ethers and unconverted synthesis gas. Suitable catalysts comprise said DMK-10 and alkali promoted $ZnQ/Cr_2O_3$ and Cu/ZnO arranged e.g. in turn or as mixtures.

Several bypass possibilities are present. Bypass streams 8, 9 and 11 may serve as means of cooling and/or feed adjustments of downstream reactors providing for improved conversion. Synthesis gas 10 can be added to second oxygenate synthesis step 4 via bypass 8 or alternatively directly to third oxygenate synthesis step 6 via bypass 9. Furthermore, some of the effluent 3 from the first oxygenate synthesis step 2 can bypass the second oxygenate synthesis step 4 and be added to the feed (i.e. to the second oxygenate effluent 5) to the third oxygenate synthesis step 6. These bypasses have the advantage of serving as means of cooling and/or feed adjustments of downstream reactors providing for improved conversion as previously mentioned.

Synthesis gas adjustments may comprise the adjustments obtained through the water gas shift reaction, whereby the hydrogen to carbon monoxide ratio may be increased if water is added to a process step active in the water gas shift reaction or one or more components can be removed by absorptive or membrane units.

Figure 3:
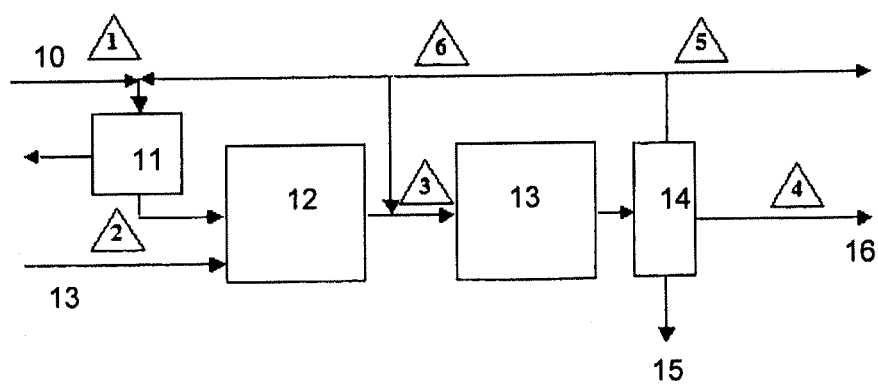
FIG. 3 shows an embodiment of the process including the separation step.

FIG. 3 illustrates another embodiment of the invention. In this embodiment heat exchangers and compressors are not shown. The separation step has been detailed to show the placement of the separator (14) integrated in the synthesis loop. The figures in triangles are reference points mentioned in the Examples 4-6.

Coal gas 10 obtained from the gasification of coal and containing synthesis gas is mixed with recycle gas and subjected to an acid gas removal (AGR) step 11 in which acidic sulphur compounds and carbon dioxide are removed. The effluent from the acid gas removal step 11 is sent to the oxygenate synthesis step 12 for the synthesis of oxygenates, e.g. methanol and higher alcohols. Water 13 is added to the process, either as liquid or as steam, upstream of oxygenate synthesis step 12 in order to adjust the resulting unconverted synthesis gas composition at the outlet of the oxygenate synthesis step.

In this specific embodiment the AGR set-up is placed inside the integrated synthesis loop. Another AGR set-up may be placed on the coal gas feed line as alternative or in addition to the AGR inside of the loop. These alternative layouts may be considered for economic reasons, but for the demonstration of the process conversion efficiencies and the related effects to recycle rates this approach represents the most beneficial with respect to conversion.

In addition, further removal of sulphur compounds may be necessary, such as fine sulphur removal over an appropriate, conventional absorbent mass placed upstream of the oxygenate synthesis step 12 but not shown in FIG. 3.

The oxygenate effluent produced in the oxygenate synthesis step 12 is transferred to gasoline synthesis step 13 for synthesis of gasoline. The effluent from the gasoline synthesis step 13 is sent to VLL separator 14 for separation of raw gasoline 16 and water 15.

The raw gasoline produced contains propane and butane and dissolved gases and is sent to a distillation section for fractionation to obtain gasoline (and propane and butane, which may be seen as co-produced). Olefinic contents in the raw gasoline may be hydrogenated. Gasoline components may be recovered from the purge gas.

In a preferred embodiment the oxygenate synthesis step is laid out such that the temperature level of the effluent from this step is adequate to make heating or cooling prior to the gasoline synthesis step superfluous.

By means of the following examples the invention is further demonstrated.

In the examples the term HA is used to denote higher alcohols and their equivalents.

EXAMPLES

Example 1

A series of experiments were carried out in a quartz reactor of 4 mm inner diameter. 250 mg of HZSM-5 zeolite catalyst (150-300 μm sized particles) was mixed with 500 mg of silicon carbide, SiC and loaded into the reactor.

Five different feeds were used as shown in Table 1:

TABLE 1

| Feed | Oxygenate content (mole %) |
|---|---|
| 1 | 7% methanol in $N_2$ |
| 2 | 7% of a 70/30 mole % methanol/ethanol mixture in $N_2$ |
| 3 | 7% of a 70/30 mole % methanol/1-propanol mixture in $N_2$ |
| 4 | 7% of a 70/30 mole % methanol/i-butanol mixture in $N_2$ |

The reaction conditions were atmospheric pressure and temperatures ranging from 250-370° C. and flow rate of 60 Nml/min and 105 Nml/min., respectively, corresponding to a WHSV of 1.4 (industrially typical) and 2.45 g/g catalyst h.

Figure 4A:
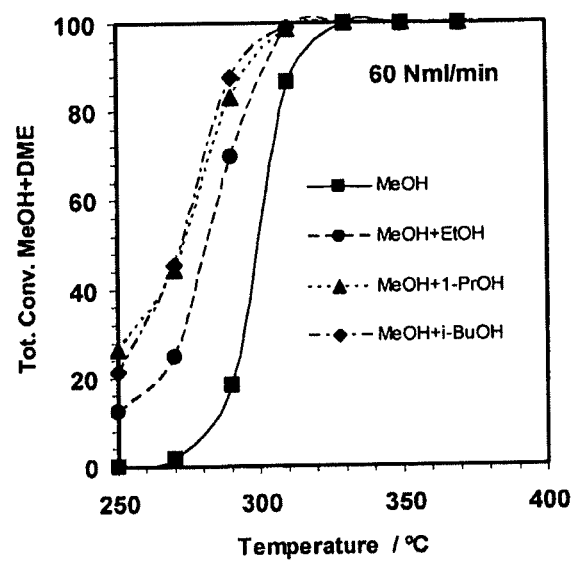
FIGS. 4a and 4b show the conversion of methanol and higher alcohols at different flow rates.
Figure 4B:
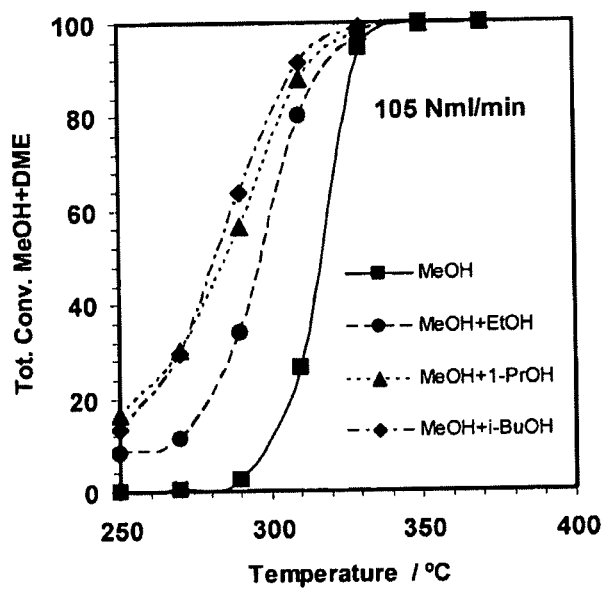
Figure 5A:
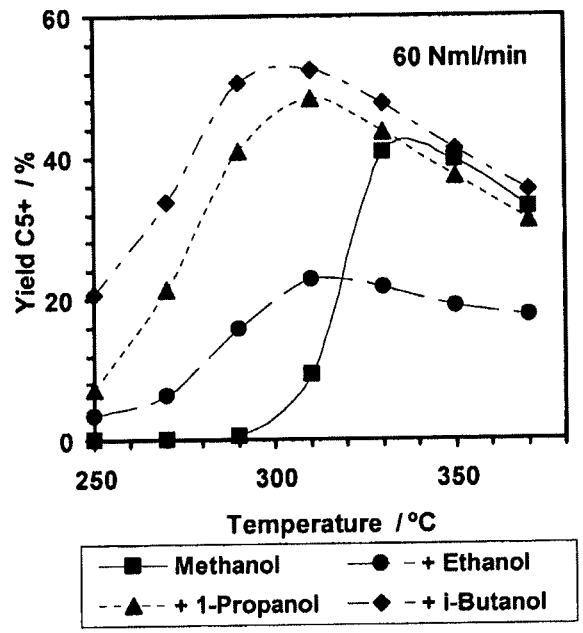
FIGS. 5a and 5b show the yield obtained on conversion of methanol and higher alcohols.
Figure 5B:
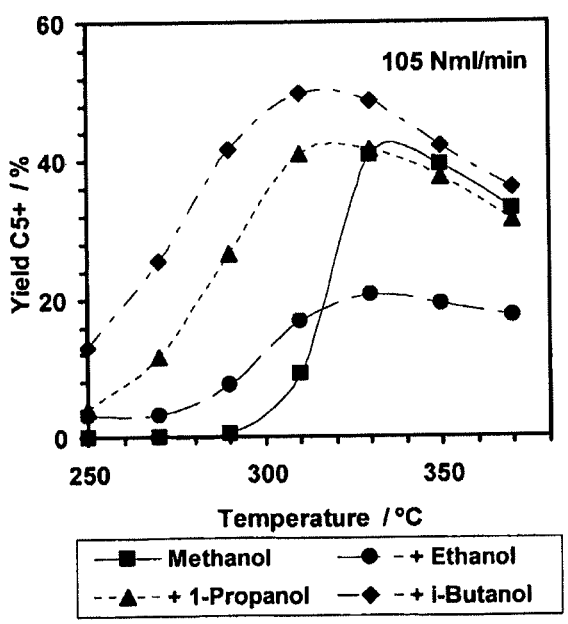

FIGS. 4a and 4b show the total conversion of methanol and dimethyl ether as a function of the isothermal operating temperature and FIGS. 5a and 5b show the yield of $C_{5+}$ products as a function of the isothermal operating temperature.

As can be seen in FIGS. 4 and 5, the conversion of methanol as well as the yield as function of temperature was recorded for each experiment. In these figures, the conversion is defined as:

$$\text{conversion} = 100\% * \frac{N^0_{C\,Methanol+DME} - N_{C\,Methanol+DME}}{N^0_{C\,Methanol+DME}}$$

where:
$N^0_{C\,Methanol+DME}$ is the total amount of carbon present in methanol and DME in the feed, and
$N_{C\,Methanol+DME}$ is the total amount of carbon present in methanol and DME in the product.

The yield is defined as the percentage of carbon atoms originating from methanol, DME or higher alcohols that is present in the indicated product or product group.

As can be noted from the figures, the conversion of methanol increased when neither ethanol, i-propanol nor 1-butanol is added whereas the yield of $C_{5+}$ components increased for added $C_{3+}$ higher alcohols only. As can be seen from FIG. 5, the yield as function of temperature is independent of the higher alcohol added above the temperature, where all alcohols and DME are converted. It can also be seen that ethanol in spite of its accelerating effect low-ers the yield of the gasoline components in the product. It seems also that alcohols higher than ethanol, i.e. $C_{3+}$ alcohols, exhibit both an accelerating and yield improving effect.

Figure 6A:
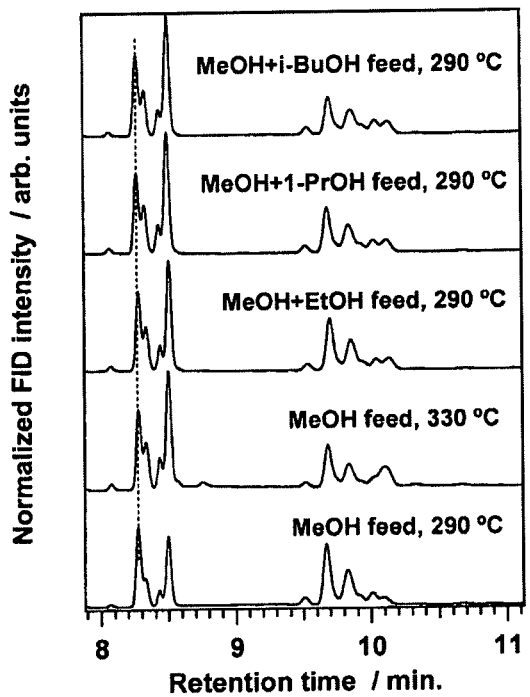
FIGS. 6a and 6b show the chromatographic results obtained from a mixture of methanol and higher alcohols.
Figure 6B:
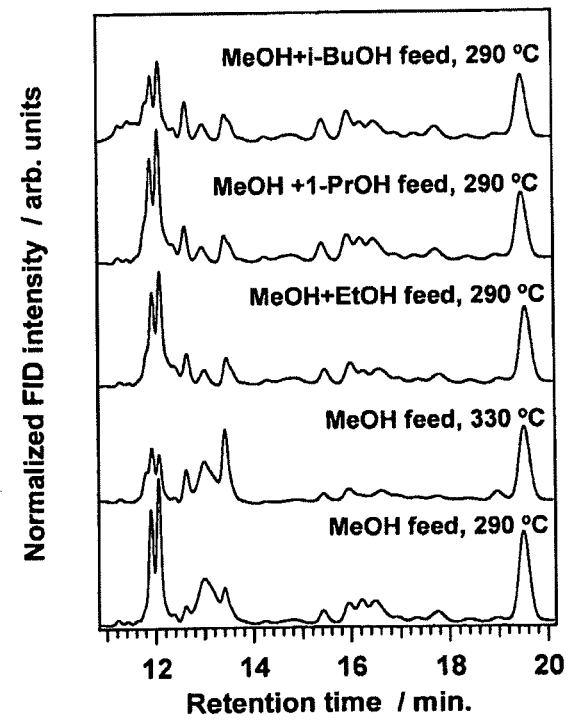

The observations made by Le Van Mao et al. that the product distribution obtained from the conversion of propanol and butanol is very close to the product distribution obtained from methanol conversion was confirmed through analysis. See FIGS. 6a and 6b which show the chromatographic results on the hydrocarbon product distribution obtained from methanol and 70/30 mole % methanol/higher alcohol mixtures (feeds 1-4).

Example 2

This is an example which demonstrates one of the fundamentals of the invention namely the obtained effect of a reduction in the temperature at which conversion occurs.

Example 1 was repeated. However, while maintaining a concentration of 7 mole % of methanol in the mixture with nitrogen, a further mixture of higher alcohols (HA) with the specified composition as shown in Table 2 was added. The mixture of higher alcohols was added at different rates expressed through its wt % to the methanol fed at values between 0.1 to 35 wt % of HA. Ethanol does not fall under the definition of $C_{3+}$ higher alcohols, but has been included for comparative reasons.

TABLE 2

| HA | Mole % |
| --- | --- |
| ethanol | 13.45 |
| n-propanol | 12.97 |
| i-propanol | 3.01 |
| n-butanol | 8.69 |
| 2-butanol | 3.47 |
| i-butanol | 41.13 |
| n-pentanol | 7.89 |
| n-hexanol | 9.41 |

Similar higher alcohol mixture is obtainable from conversion of synthesis gas according to U.S. Pat. No. 4,668,656. The flow rates were 60 Nml/min and 150 Nml/min. corresponding to a methanol based WHSV of 1.4 and 3.5 g/g catalyst h.

The obtained conversion of methanol and higher alcohols as well as the yield as function of temperature are presented for each experiment in FIGS. 7a, 7b, 8a and 8b. The conversion and yield are used according to the definitions under Example 1.

Figure 7A:
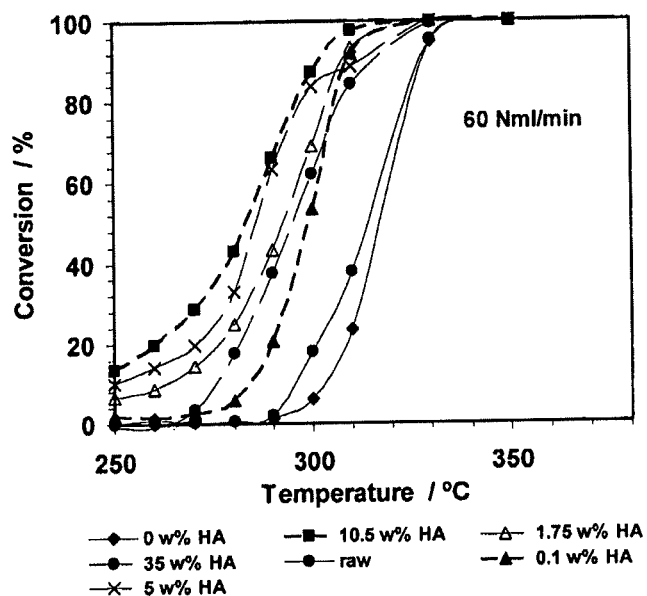
FIGS. 7a and 7b show the conversion of a mixture of methanol and higher alcohols.
Figure 7B:
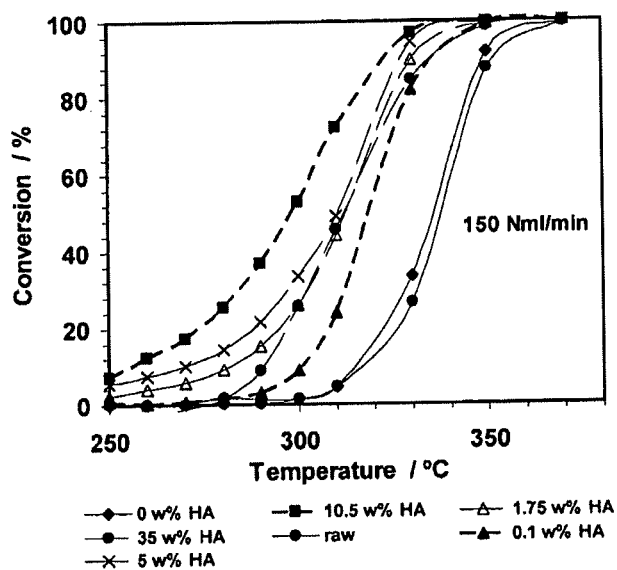

FIGS. 7a and 7b show the conversion of methanol and higher alcohols as a function of the isothermal operating temperature. The conversion of a raw methanol (labelled "raw" in the figures) described in comparative Example 3 is depicted along with the conversions obtained for the higher alcohol (HA) mixtures.

Figure 8A:
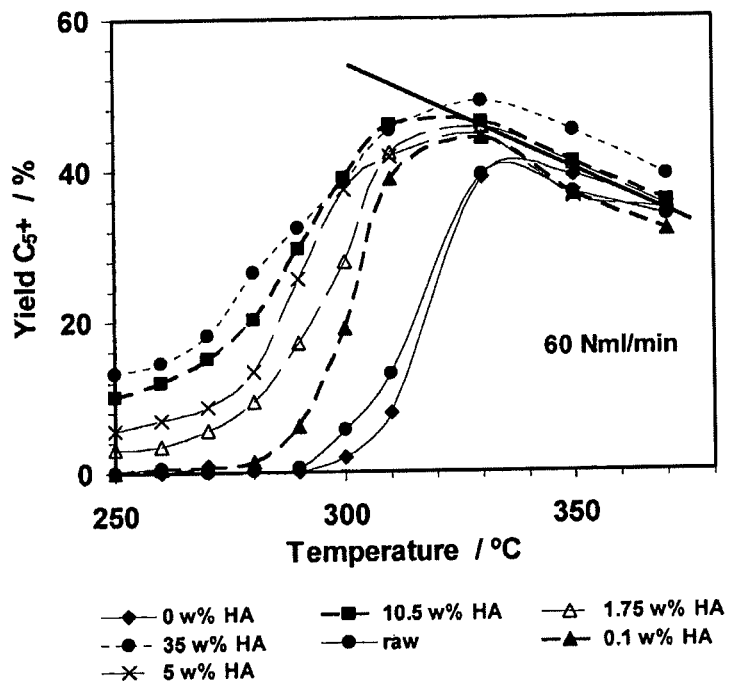
FIGS. 8a and 8b show the yield of a mixture of methanol and higher alcohols.
Figure 8B:
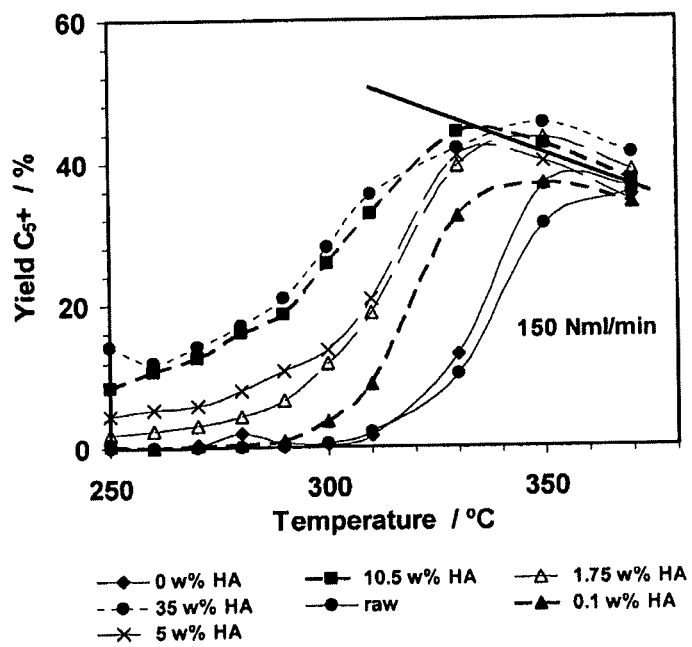

FIGS. 8a and 8b show the yield of $C_{5+}$ products including that of raw methanol as a function of the isothermal operating temperature.

As can be seen from the curves in both figures a notable effect arises by adding even minute amounts of higher alcohol to the methanol feed. The operating temperature may be reduced by approximately 20-30° C. e.g. from 350° C. to approximately 320-330° C., depending on the content of higher alcohols as compared to a methanol feed without/with conventional by-product composition and level. As can be seen from FIGS. 8a and 8b the yield as function of temperature is independent on the higher alcohol mixture added above the temperature where all oxygenate is converted.

Example 3 (Comparative)

This example is not according to the invention. It serves to demonstrate that conductance of an integrated oxygenate process as described in U.S. Pat. No. 4,076,761, where the oxygenate synthesis step is a methanol synthesis with byproducts does not bring about the effects needed for fulfilling the object of the present invention.

Above experiment was repeated. However, the pure methanol solution was replaced by a raw methanol solution composed through the addition of the higher alcohols as shown in Table 3. The composed raw methanol solution represents a typical composition from a state-of-the-art methanol plant.

TABLE 3

| HA in raw methanol | Concentration (mole ppm) |
| --- | --- |
| ethanol | 487 |
| 1-propanol | 75 |
| 2-propanol | 32 |

TABLE 3-continued

| HA in raw methanol | Concentration (mole ppm) |
| --- | --- |
| 1-butanol | 40 |
| 2-butanol | 11 |

As can be seen in the results shown in FIGS. 7a, 7b, 8a and 8b in the composition denoted "raw", the conversion of methanol, when containing the conventional level and distribution of higher alcohols, is not distinguishable from the conversion of pure methanol.

Figure 9A:
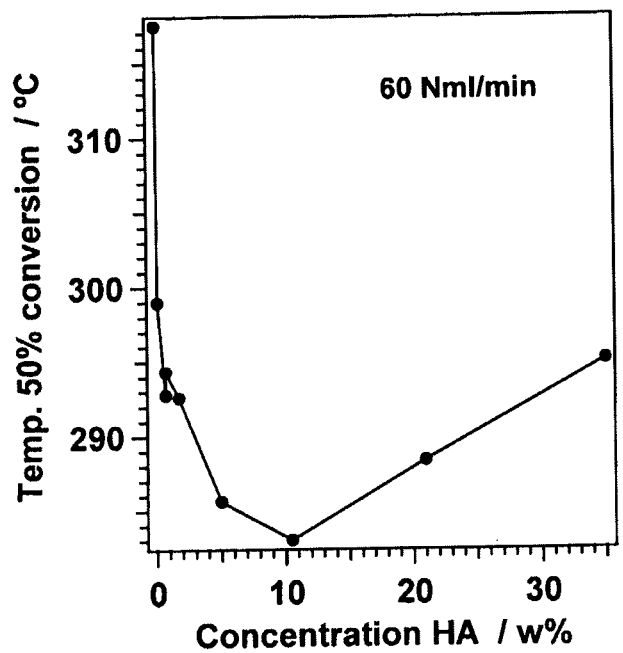
FIGS. 9a and 9b show the 50% conversion temperature as a function of the concentration of higher alcohols.
Figure 9B:
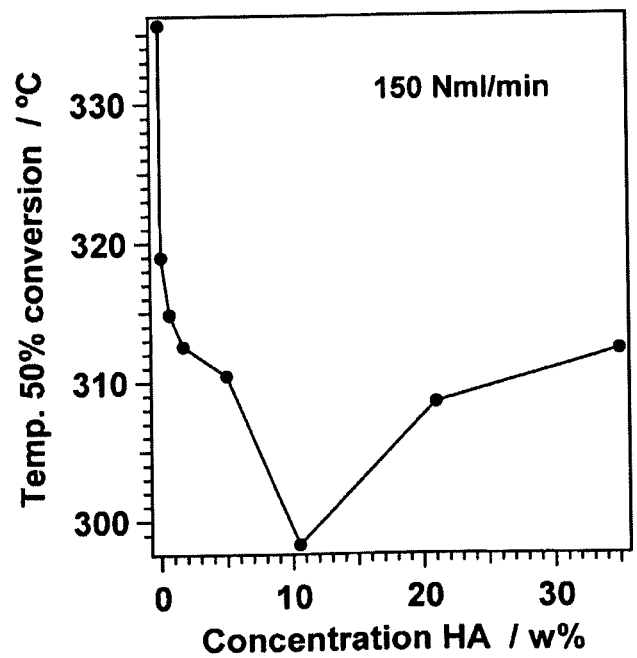

Based on the above results the effect of temperature reduction is shown in FIGS. 9a and 9b.

The temperature at which 50% conversion is obtained is arbitrarily chosen to illustrate the observed effect of temperature reduction by adding higher alcohols. This temperature is found by interpolation from FIGS. 7a and 7b. The effect of temperature at other conversion levels may differ from those depicted in FIGS. 9a and 9b. In FIGS. 9a and 9b it is seen that the operating temperature can be decreased at very low levels of added higher alcohols.

As demonstrated the effect is maintained and is observed at very low levels of higher alcohols added. With a content of $C_{3+}$ higher alcohols of at least 0.05 wt % on a total oxygenate basis the effect is pronounced. A maximum temperature effect is observed at around 10 wt % HA added.

As can be seen, the effect is largely reproducible at a higher WHSV. The temperature needed to obtain 50% conversion is higher for a higher WHSV but the effect, the temperature decrease obtained, remains.

By means of comparative Examples 4, 5 and 6, it will be demonstrated that in an integrated synthesis with maximum benefit according to U.S. Pat. No. 4,076,761 the necessary recycle rate for a fixed gasoline yield (exit temperature) is remarkably higher than in the process of the invention.

In order to obtain comparable gasoline raw product quality the ratio of the internal recycle to the external recycle should be kept constant. The reduction of the recycle(s) reduces the pressure drop in the integrated synthesis and thereby the duty and size of the recycle compressor(s) in the integrated synthesis as well as the equipment sizes and duty on heat exchangers. A more economic process is thereby obtained.

Example 4 (Comparative)

This is a comparative example based on a synthesis mass balance which is not illustrating the present invention but is comparable to prior art. The process is the integrated oxygenate and gasoline synthesis favoured by internal $CO_2$ removal, in which the oxygenate is methanol produced with a conventional level of by-products, namely 487 mole ppm ethanol, 75 mole ppm 1-propanol, 32 mole ppm 2-propanol, 40 mole ppm 1-butanol and 11 mole ppm 2-butanol as shown in Table 3.

A feed gas (100 kmole/h) containing (as a typical coal gas) 37.48 mole % $H_2$, 45.39 mole % CO, 15.95 mole % $CO_2$, 0.6 mole % $N_2$ and 0.58 mole % S compounds at a pressure of 55 bar is sent to the gasoline synthesis loop illustrated in FIG. 3. In order to secure proper utilisation of the raw material synthesis gas, a target minimum overall conversion of synthesis gas to oxygenates of 96% has been set and a yield of 78% of gasoline products has been set.

The presence of methanol with conventional level of byproducts allows for the inlet temperature of 350° C. in order to obtain stable conversion.

Accordingly, a process was set up on the basis that a simple VLL equilibrium at 40° C. separates the unconverted synthesis gas from the gasoline raw product and water produced in the integrated process, and that an adiabatic gasoline reactor is employed. The minimum external recycle required in order to meet the targets set, while observing the synthesis gas conversion efficiency, the gasoline yield and the gasoline temperature limitations as constraints, were hereby obtained as result.

The minimum recycle rates found were 3.2 times the make up for the external recycle and 3.6 times the make up for the internal recycle.

In the following examples, the ratio between the internal and the external recycles was accordingly kept constant (external recycle/internal recycle=3.2/3.6=0.89) for comparison securing a comparable gasoline raw product quality obtained in the downstream separator.

The compositions obtained at the various positions indicated by numbers in triangles shown in FIG. 3 are listed in Table 4 below.

TABLE 4

| Composition | Position | | | | | |
|---|---|---|---|---|---|---|
| (mole %) | 1 | 2 | 3 | 4 | 5 | 6 |
| $H_2$ | 37.45 | | 46.76 | 1.83 | 48.60 | 48.60 |
| CO | 45.35 | | 15.13 | 1.54 | 15.75 | 15.75 |
| $CO_2$ | 15.89 | | 5.50 | 3.42 | 5.68 | 5.68 |
| $N_2$ | 0.60 | | 15.15 | 1.33 | 15.72 | 15.72 |
| $H_2S$ | 0.57 | | 0 | 0 | 0 | 0 |
| $H_2O$ | 0.13 | 100.0 | 0.17 | — | 0.1 | 0.1 |
| MeOH | 0 | | 3.74 | 0 | 0 | 0 |
| DME | 0 | | 0 | 0 | 0 | 0 |
| HA | 0 | | 11 ppm | 0 | 0 | 0 |
| $C_{5+}$ | 0 | | 0.58 | 61.68 | 0.60 | 0.60 |
| $C_{4-}$ | 0 | | 12.98 | 30.20 | 13.55 | 13.55 |
| Flow rate, kmole/h | 1000 | 180.9 | 7069 | 49.3 | 34.1 | 6766 |

Example 5 (Comparative)

This is an example on a synthesis mass balance which is not illustrating the present invention but serves as a comparison. The process is a repetition of Example 4, with the exception that the oxygenate synthesis is now a combined methanol and dimethyl ether synthesis.

The allowed inlet temperature to the gasoline synthesis does not change by changing the feed as compared to previous Example 4.

The compositions in the diagram positions in FIG. 3 as found are listed in table 5 below.

TABLE 5

| Composition | Position | | | | | |
|---|---|---|---|---|---|---|
| (mole %) | 1 | 2 | 3 | 4 | 5 | 6 |
| $H_2$ | 37.45 | | 11.73 | 0.49 | 12.11 | 12.11 |
| CO | 45.35 | | 11.72 | 1.23 | 12.09 | 12.09 |
| $CO_2$ | 15.89 | | 7.42 | 4.41 | 7.57 | 7.57 |
| $N_2$ | 0.60 | | 43.30 | 3.98 | 44.41 | 44.41 |
| $H_2S$ | 0.57 | | 0 | 0 | 0 | 0 |
| $H_2O$ | 0.13 | 100.0 | 0.07 | — | 0.1 | 0.1 |
| MeOH | 0 | | 0.18 | 0 | 0 | 0 |
| DME | 0 | | 2.51 | 0 | 0 | 0 |
| HA | 0 | | 0 ppm | 0 | 0 | 0 |
| $C_{5+}$ | 0 | | 0.69 | 57.09 | 0.66 | 0.66 |
| $C_{4-}$ | 0 | | 22.38 | 32.80 | 23.03 | 23.03 |
| Flow rate, kmole/h | 1000 | 51.8 | 5225 | 54.9 | 8.7 | 5075 |

The minimum recycles required was found to be 2.4 for the external recycle (set by catalyst hot spot) and 2.7 for the internal recycle.

The synthesis gas conversion efficiency is superior to the efficiency as obtained in Example 4, namely 98%. In effect the external recycle could be reduced, also improving the quality of the raw gasoline product obtained in the separator. However, the sum of the internal and external recycles ratios to the make up would anyway have to be largely the same in order to meet the temperature limits of the gasoline reactor.

Example 6

This is an example which illustrates the advantages obtained by the use of present invention. In the oxygenate synthesis a combined methanol and dimethyl ether followed by the combined methanol and higher alcohol synthesis is conducted.

Same target on efficiency and yield has been set in the process presented in Example 4 and illustrated in FIG. 3.

The compositions in the diagram positions in FIG. 3 as found are listed in table 6 below.

TABLE 6

| Composition | Position | | | | | |
|---|---|---|---|---|---|---|
| (mole %) | 1 | 2 | 3 | 4 | 5 | 6 |
| $H_2$ | 37.45 | | 18.08 | 0.80 | 19.16 | 19.16 |
| CO | 45.35 | | 18.05 | 1.99 | 19.09 | 19.09 |
| $CO_2$ | 15.89 | | 14.93 | 9.23 | 15.50 | 15.50 |
| $N_2$ | 0.60 | | 25.97 | 2.48 | 27.28 | 27.28 |
| $H_2S$ | 0.57 | | 0 | 0 | 0 | 0 |
| $H_2O$ | 0.13 | 100.0 | 0.20 | — | 0.1 | 0.1 |
| MeOH | 0 | | 0.30 | 0 | 0 | 0 |
| DME | 0 | | 4.14 | 0 | 0 | 0 |
| HA | 0 | | 0.55 | 0 | 0 | 0 |
| $C_{5+}$ | 0 | | 0.64 | 55.51 | 0.76 | 0.76 |
| $C_{4-}$ | 0 | | 17.14 | 29.99 | 18.17 | 18.17 |
| Flow rate, kmole/h | 1000 | 40.6 | 2547 | 56.3 | 16.9 | 2400 |

The minimum recycle ratios required were found to be 1.12 for the external recycle and 1.28 for the internal recycle, observing the constancy of ratio of the recycle ratios. The synthesis gas conversion efficiency is superior to the efficiency as obtained in Example 4, namely 98%.

The minimum external recycle, as found in Example 6, was found to be low yet above zero in this specific process. It may be preferable to arrange the reactors of the oxygenate section to completely avoid the external recycle if allowed for on the conversion efficiency criterion.

As is clearly demonstrated the particular integration of an oxygenate synthesis producing higher alcohol and a gasoline synthesis brings about dramatic reduction on the recycle rates required to obtain appropriate efficiency and gasoline yields.

Example 7

This example illustrates one embodiment of present invention described above relating particularly to the synergies obtained when co-feeding a stream of raw, aqueous bioethanol to the oxygenate synthesis part of the integrated gasoline synthesis.

Same target on efficiency and yield has been set in the process presented in Example 4 and illustrated in FIG. 3.

The compositions in the diagram positions in FIG. 3 as found are listed in Table 7 below.

TABLE 7

| Composition (mole %) | Position | | | | | |
|---|---|---|---|---|---|---|
| | 1 | 2 | 3 | 4 | 5 | 6 |
| $H_2$ | 37.45 | | 17.51 | 0.78 | 18.59 | 18.59 |
| CO | 45.35 | | 17.48 | 1.93 | 18.53 | 18.53 |
| $CO_2$ | 15.89 | | 15.23 | 9.43 | 15.82 | 15.82 |
| $N_2$ | 0.60 | | 26.42 | 2.54 | 27.78 | 27.78 |
| $H_2S$ | 0.57 | | 0 | 0 | 0 | 0 |
| $H_2O$ | 0.13 | 95.0 | 0.21 | — | 0.1 | 0.1 |
| MeOH | 0 | | 0.26 | 0 | 0 | 0 |
| DME | 0 | | 4.19 | 0 | 0 | 0 |
| EtOH | 0 | 5.0 | 0.02 | 0 | 0 | 0 |
| HA | 0 | | 0.62 | 0 | 0 | 0 |
| $C_{5+}$ | 0 | | 0.65 | 55.27 | 0.69 | 0.69 |
| $C_{4-}$ | 0 | | 17.41 | 30.05 | 18.48 | 18.48 |
| Flow rate, kmole/h | 1000 | 39.6 | 2471 | 57.4 | 16.4 | 2328 |

The minimum recycle ratios required were found to be 1.10 for the external recycle and 1.23 for the internal recycle, observing the constancy of ratio of the recycle ratios. The synthesis gas conversion efficiency is superior to the efficiency as obtained in Example 4, namely 98%.

In parallel to Example 6 the minimum external recycle, as found in Example 7, was found to be low yet above zero in this specific process. It may be preferable to arrange the reactors of the oxygenate section to completely avoid the external recycle, if allowed for on the conversion efficiency criterion.

As is demonstrated above the particular co-feeding of a stream comprising ethanol to the oxygenate synthesis step co-producing higher alcohol eventually passed to a gasoline synthesis reactor brings about further reduction on the recycle rates required to obtain appropriate efficiency and gasoline yields.

The invention claimed is:

1. A process for the synthesis of hydrocarbon constituents of gasoline, comprising the steps of:
   (a) providing a synthesis gas in an oxygenate reactor:
   (b) converting the synthesis gas in an oxygenate synthesis step, in the presence of an oxygenate synthesis catalyst, to an oxygenate-containing feed comprising methanol and/or dimethyl ether, and further comprising a C3+ higher alcohol mixture in the amount of 5-15 wt % on a total oxygenate basis of the oxygenate-containing feed; wherein the oxygenate synthesis catalyst is selected from the group consisting of $ZnO/Cr_2O_3$, Cu/ZnO, transition metal sulfides, Cu-containing oxide complexes, $ZnO/ZrO_2$ promoted with a redox oxide and a strong base, Pd and Cu on zirconia, Pd and Cu on rare earth oxides, and mixtures thereof;
   (c) converting the oxygenate-containing feed, in the presence of gasoline synthesis catalyst, to hydrocarbon constituents of gasoline; and
   (d) cooling the oxygenate-containing feed by indirect heat exchange with boiling water inside the gasoline reactor during the gasoline synthesis.

2. The process according to claim 1, wherein the oxygenate synthesis step comprises at least one additional reactor being in series or parallel with the oxygenate synthesis step.

3. The process according to claim 2, wherein the C3+ higher alcohol mixture optionally comprises oxygenates selected from the group of consisting of aldehydes and ketones, carboxylic acids, and alkyl esters thereof.

4. The process according to claim 3, wherein the oxygenate-containing feed further comprises ethanol and water.

5. The process according to claim 4, wherein the oxygenate-containing feed further comprises raw, aqueous ethanol produced from renewables.

6. The process according to claim 2, further comprising:
   separating the oxygenate-containing feed into an oxygenate-rich liquid fraction containing methanol and the C3+ higher alcohol mixture and an oxygenate-lean gas fraction comprising unconverted synthesis gas, and
   converting the oxygenate-rich fraction to the effluent comprising the hydrocarbon constituents of gasoline.

7. The process according to claim 2, wherein the oxygenate synthesis catalyst comprises alumina, silica-alumina, and/or zeolite and further comprises Cu and/or ZnO.

8. The process according to claim 2, wherein the synthesis gas is subjected to an acid gas removal step before conversion to the oxygenate-containing feed.

9. The process according to claim 2, further comprising:
   separating the effluent to obtain a main portion comprising the hydrocarbon components and water and further obtaining from the effluent a balance stream comprising unconverted synthesis gas wherein the balance stream is recycled to the oxygenate synthesis step and/or the gasoline synthesis step.

10. The process according to claim 2, comprising bypassing a fraction of the synthesis gas from at least one of the oxygenate synthesis steps.

11. The process according to claim 2, wherein water is added to at least one of the oxygenate synthesis steps.

12. A process for the synthesis of hydrocarbon constituents of gasoline comprising:
   (a) directing an oxygenate-containing feed to a gasoline reactor, wherein the oxygenate-containing feed comprises methanol and/or dimethyl ether and further comprises a C3+ higher alcohol mixture in the amount of 5-15 wt % on a total oxygenate basis of the oxygenate-containing feed;
   (b) converting the oxygenate-containing feed, in the presence of a gasoline synthesis catalyst, to an effluent comprising hydrocarbon constituents of gasoline; and
   (c) cooling the oxygenate-containing feed by indirect heat exchange with boiling water inside the gasoline reactor during the gasoline synthesis,
   wherein the oxygenate-containing feed is produced in the presence of an oxygenate synthesis catalyst selected from the group consisting of $ZnO/Cr_2O_3$, Cu/ZnO, transition metal sulfides, Cu-containing oxide complexes, $ZnO/ZnO_2$ promoted with a redox oxide and a strong base, Pd and Cu on zirconia, Pd and Cu on rare earth oxides, and mixtures thereof.

* * * * *